July 21, 1942.　　　　W. J. MILLER　　　　2,290,761
METHOD OF EDGE GLUING VENEER STRIPS
Filed April 15, 1939　　　2 Sheets-Sheet 1

INVENTOR.
William J. Miller
BY Fred C. Matheny
ATTORNEY

July 21, 1942.  W. J. MILLER  2,290,761
METHOD OF EDGE GLUING VENEER STRIPS
Filed April 15, 1939  2 Sheets-Sheet 2

INVENTOR.
William J. Miller
BY
Fred C. Matheny
ATTORNEY

Patented July 21, 1942

2,290,761

UNITED STATES PATENT OFFICE 2,290,761

METHOD OF EDGE GLUING VENEER STRIPS

William J. Miller, Seattle, Wash., assignor to Elliott Bay Mill Co., Seattle, Wash., a corporation of Washington Application April 15, 1939, Serial No. 268,035

3 Claims. (Cl. 144—309)

This invention relates to a new method of joining veneer strips together in edge to edge relation.

The general objects of this invention are to provide a new and improved method of process of edge joining strips of veneer whereby an increase in production in a veneer plant is made possible, waste of material is greatly reduced, production costs are lowered, and the quality of the finished plywood is improved.

The edge joining of strips of veneer is not new and has been carried out in various ways, such as by the used of gummed tape, by mechanical fasteners such as soft metal staples, and by edge gluing. The edge gluing of the veneer strips is the most desirable method of securing them together as it eliminates the use of undesirable superficial means such as staples or tape. However the edge gluing of veneer strips is not generally employed because the methods and machines heretofore used for this purpose have been slow and expensive and unreliable and require the services of a large number of men to edge glue all of the veneer required in a large plant.

One method heretofore used for edge gluing veneer strips requires the veneer strips to be fed through the machine in a direction lengthwise of the grain. This requires the veneer strips to travel a total distance in the machine equal to the total length of the edges being glued, for instance, if a sheet of veneer is one hundred inches long and six feet wide and comprises six pieces having five edge joints it would have to travel longitudinally a total distance of five hundred inches in a machine to complete the edge gluing. If this same piece travels through a machine in a direction crosswise of the grain the gluing will be completed in a very much less distance of travel and the distance of travel of the panel in the machine will not need to be much more than the width of the panel.

Another method heretofore used for edge gluing veneer strips provides for feeding the veneer strips in a direction crosswise of the grain and stopping each joint between hot plates long enough to set the glue. This results in a slow process as the veneer must be stopped for the curing of each joint and it will be apparent that this process will be especially slow if narrow veneer pieces are to be edge glued.

In accordance with my method of edge gluing veneer strips I move the veneer strips synchronously with a continuously moving heated platen and hold the adjoining edges of the veneer strips immovable relative to each other and immovable relative to the surface of the platen while the glue that secures the adjoining edges of the strips together is being cured and set.

In accordance with present practice in veneer plants a sheet of veneer stock coming in a continuous strip from a log in a lathe is cut transversely of the sheet and lengthwise of the grain of the wood to form panels. If no defects are present in the sheet it is cut into panels of a predetermined correct width. However there are usually numerous defective portions to be cut out of the sheet and the cutting out of these defective portions results in the production of a large number of narrow pieces which heretofore have usually been disposed of as waste and have not been utilized.

My present invention makes it possible to utilize a large proportion of these narrow strips of from two to twelve inches in width by providing a method of edge gluing which is fast enough and inexpensive enough so that they may be utilized with practically no additional labor cost over present methods. In commercial operation the saving in material or yield per thousand feet of logs is increased by at least twelve and one half percent. On a thirty dollar log cost this would be a saving of approximately four dollars over and above the cost of present day methods.

My invention makes it commercially practical to edge glue all of the veneer pieces used in large veneer plants, including the pieces used for the cores or inside plies. This substantially eliminates the possibility of openings being left between the edges of adjacent pieces of core stock and results in the production of better plywood. In accordance with methods heretofore used it is common practice to feed the separate pieces of core stock through the glue rolls and place these separate pieces in edge to edge relation between the outer plies of stock with the edges of the core pieces as close together as they can conveniently be placed. The core, made up in this way, often consists of a large number of relatively narrow pieces and this method has usually resulted in numerous small openings being left between adjacent pieces of the core or inside ply. These openings weaken the veneer, facilitate the entrance of moisture between the plys, detract from the appearance of the veneer and make it difficult to provide a good finish on the edge of the veneer. Edge gluing of the veneer pieces in accordance with my process overcomes all of these difficulties and at the same time results in a saving in the costs of production of the veneer.

Another objectionable and wasteful feature of present practice which my method will overcome is as follows: In present practice the veneer pieces which are used for the core are of irregular and uneven shape and size and are not sized or matched in any way to fit the panel being made. This results in uneven and overhanging edges of glued stock and these overhanging edges have to be removed with a loss of both glue and stock. In accordance with my method it is possible to have all pieces of stock cut to substantially the correct size so that there is very little waste to be trimmed away after the gluing of the panels is completed.

In accordance with my method the pieces of veneer to be edge glued are trimmed so that preferably the width of each piece is constant throughout its length and all pieces have straight edges to insure good edge to edge contact. The first step in the edge gluing operation is to apply glue to at least one edge of each veneer piece. This may be done either by hand or by mechanical means and the glue may be applied to both edges of the pieces if desired. Any suitable glue or adhesive can be used but I prefer a synthetic resin glue which sets very hard and strong under the application of heat and some pressure. The pieces are then fed to a continuously moving heated platen. At about the time the glued edges of the pieces of veneer engage with the platen they are passed under a heated roll which presses the pieces of veneer straight throughout their full length and partially sets the glue so that all joints are adhered and leveled and there are no high spots or low spots at the glued joints. The glued edges of the continuously moving pieces extend crosswise of their direction of travel and are held firmly and immovably in contact with each other and with the heated platen until the glue is completely set and cured. The thin edge glued veneer stock discharges from the platen in a continuous strip which may be cut into pieces of predetermined size and is ready to be made up into plywood as soon as it has cooled. If desired the edge glued stock may be artificially cooled as any heat in the stock at the time glue is applied thereto for making it into plywood will dry the glue too rapidly. Upon discharging from this machine the edge glued stock may pass directly to clippers and saws if desired.

Pressure on the adjoining edges of the veneer strips is preferably obtained by using a driven feed to advance the veneer strips and using the moving veneer strips to overcome the inertia and friction of the moving platen and parts associated therewith and to drive said platen and associated parts. In feeding the veneer strips to the platen with sufficient force to overcome the inertia of the platen and associated moving parts the adjoining edges of the veneer strips are pressed very firmly together and the veneer strips and platen and moving parts associated therewith all move together at the same rate of speed with no movement of the adjoining edges of the veneer strips relative to each other or relative to the platen surface on which they rest.

If sufficient pressure between the adjoining edges of the veneer pieces is not obtained by operating against the normal inertia of the moving platen and associated parts a brake or drag can be used. On the other hand if this inertia provides too much resistance a means of partially overcoming the same may be provided to avoid applying too great pressure to the edges of the veneer pieces with a possible crushing effect.

I have obtained a satisfactory setting of the glue by maintaining the adjoining edges of the veneer pieces in contact with the heated moving platen for about fifteen seconds. Obviously this time may be varied for different glues and different degrees of heat. The size of the platen will determine the speed at which the stock may be moved. A platen six feet in diameter will provide sufficient curing time so that the edge glued stock may be discharged at the rate of about forty lineal feet per minute. The stock discharges in a continues strip with the grain of the wood positioned crosswise of its direction of travel. While in contact with the heated platen the veneer stock is held straight with the edges of the strips in intimate contact and immovable relative to each other and relative to the surface of the platen. This provides a continuous process that is very fast and one that does not have any tendency to break loose cured or partially cured joints or to crush or otherwise damage the wood.

Flexible spaced apart endless traveling belt means is provided to hold the stock in contact with the platen during the during operation.

The accompanying drawings illustrate one continuously moving platen device which may be employed in carrying out my method.

In said drawings

Like reference numerals designate like parts throughout the several views.

Figure 1:
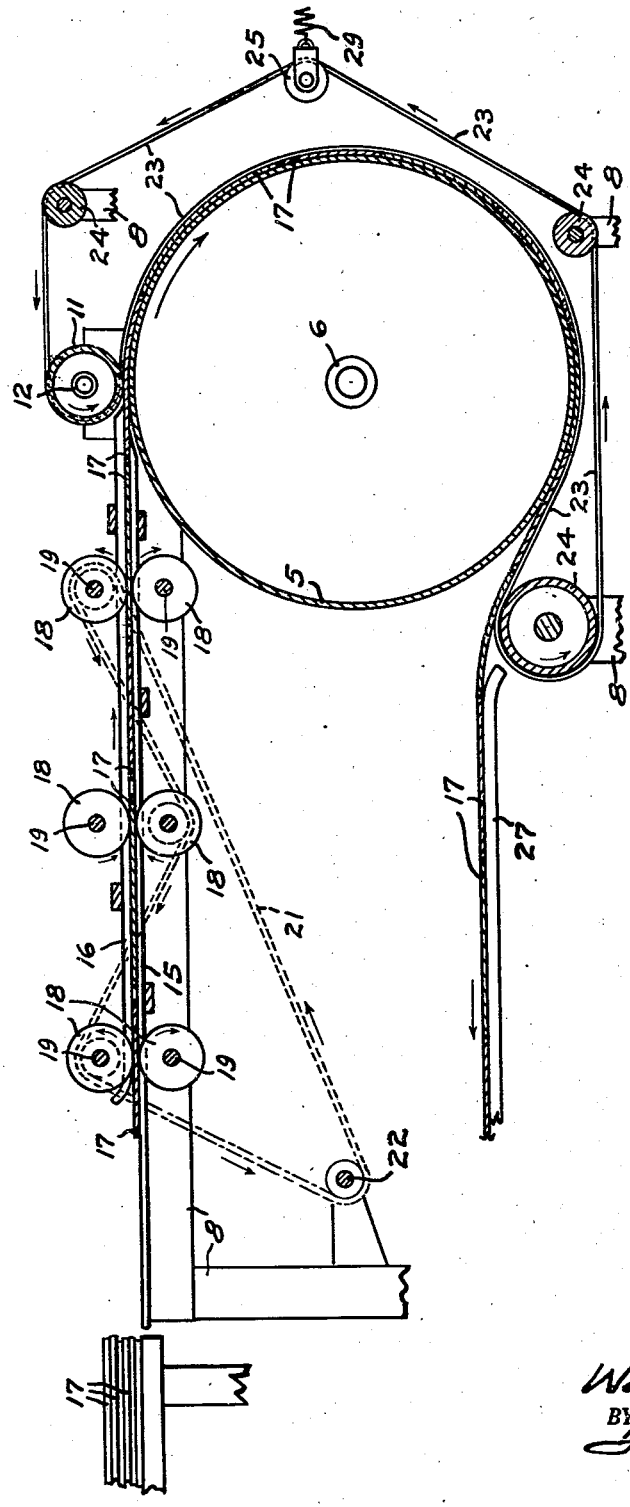
Fig. 1 is a side elevation with parts in section of a continuously moving platen device.
Figure 3:
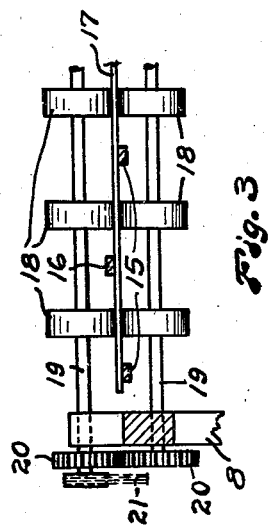
Fig. 3 is a fragmentary cross section taken substantially on broken line 3—3 of Fig. 1, and showing parts in elevation.
Figure 2:
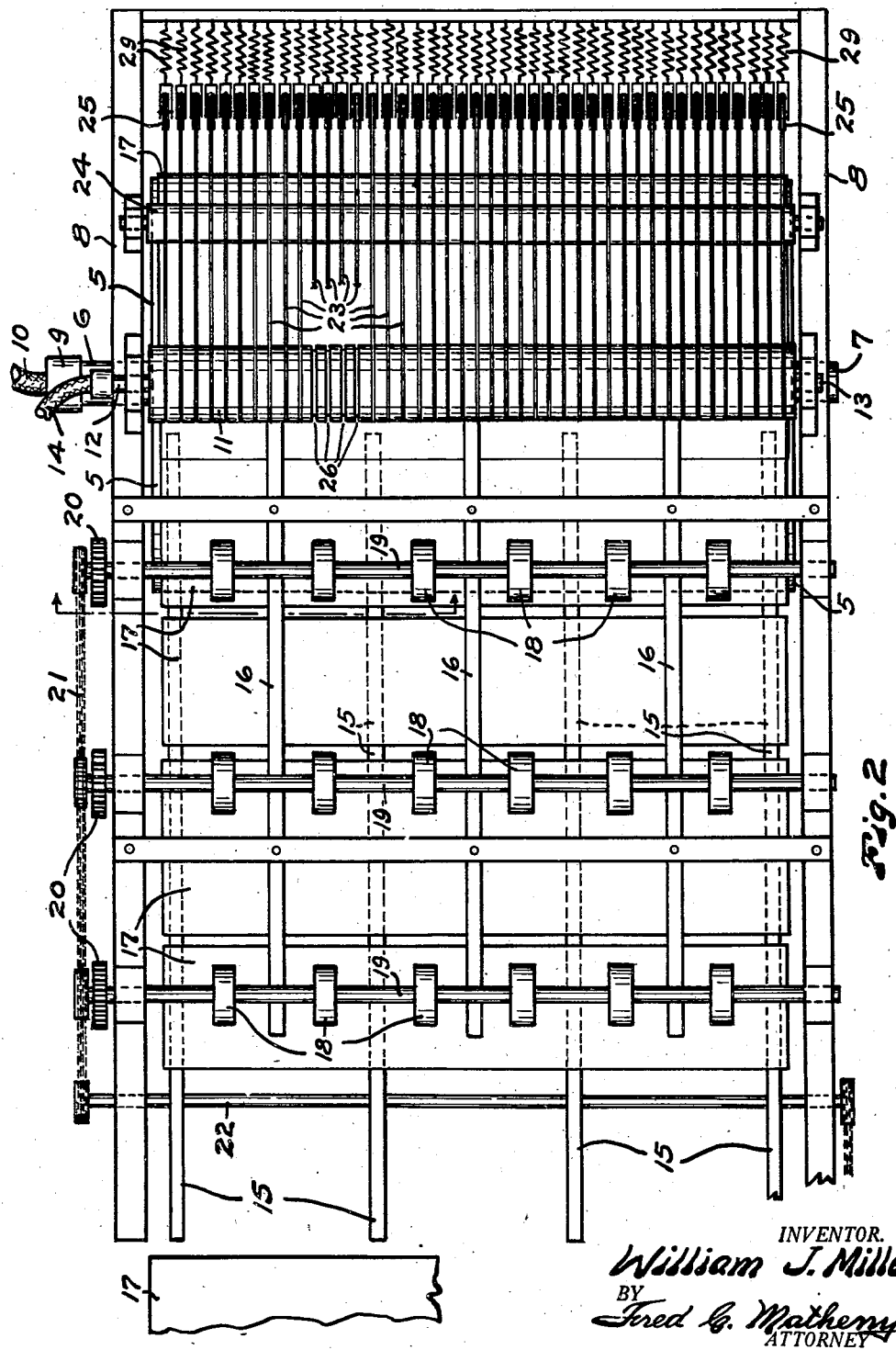
Fig. 2 is a plan view of the same.

Referring to the drawings, 5 designates a continuously moving platen in the form of a drum or cylinder of relatively large diameter. Two bearing members 6 and 7 at opposite ends of the platen 5 are journaled in frame means 8. At least one of these bearing members is preferably tubular to facilitate heating the platen. I have shown the bearing member 6 as being tubular and as being connected by a suitable packed joint 9 with a flexible conduit 10 through which steam or a like heating agent may be admitted to the drum. Obviously other heating means may be used to heat the platen 5.

A hot roll 11, preferably of tubular construction, is operatively mounted for rotation on an axis parallel with the axis of the platen 5. The periphery of the hot roll is positioned in close proximity to the periphery of the platen 5. Preferably bearing members 12 and 13, at least one of which is tubular and connected with a steam inlet conduit 14, are provided for the hot roll 11.

A feed table is positioned to deliver veneer pieces to the rolls 5 and 11. This feed table is preferably substantially tangential to the two rolls 5 and 11 at their closest point. This feed table comprises lower bars 15 and upper bars 16 spaced apart far enough to receive veneer pieces 17 therebetween. A plurality of upper and lower driven feed rolls 18 are mounted on transverse shafts 19 that are journaled in the frame means 8. The rolls 18 serve to feed the veneer pieces 17 across the feed table. The two feed rolls 18 of each pair are preferably interconnected by spur gears 20 so that they will be rotated in opposite directions. All of the feed rolls 18 are driven, in the proper direction to advance veneer pieces toward the platen 5, by a link belt 21 which is connected with a driven shaft 22 and moves in the direction indicated by the arrows.

The edge glued veneer pieces 17 are held in contact with the continuously moving platen 5 while the glue is being cured by a plurality of transversely spaced apart pliable endless belt members 23 which extend around the platen 5, preferably for one hundred eighty degrees or more. These belt members 23 extend around the hot roll 11 and are guided by a plurality of guide rolls or sheaves 24 and preferably pass through individual tightener sheaves 25 that are supported by springs 29 and are adapted to maintain a tension on each individual belt member 23. These pliable endless belt members 23 may be of twisted wire construction. The hot roll 11 has a plurality of spaced apart grooves 26 for the reception of the belt members 23. The depth of the grooves 26 is at least as great as the diameter of the belt members 23 whereby marring of the veneer pieces by the belt members as the veneer pieces pass under the hot roll 11 is avoided.

A suitable table 27 is provided for the finished material to discharge over.

In carrying out this method the veneer pieces 17, after having had glue applied to one or both edges thereof, are fed either manually or mechanically to the driven feed rolls 18 by which they are advanced between the lower bars 15 and upper bars 16 of the feed table to the platen 5 and heated roll 11. I have not herein disclosed any means for driving the platen 5 and hot roll 11 and belt members 23 as I have obtained satisfactory results and carried out my method successfully by allowing the moving veneer pieces to drive these parts. In this way the inertia of these parts is utilized to cause the adjacent edges of the veneer pieces to be pressed firmly together and to be held firmly in contact with each other throughout their entire period of engagement with the platen 5.

The veneer pieces 17 are fed crosswise of the feed table in edge to edge relation preferably with the adjacent edges substantially parallel and spaced apart a short distance. The upper and lower bars 15 and 16 of the feed table hold the veneer pieces flat and prevent any overlapping of the edges thereof as said pieces pass onto the platen 5. The inertia of the movable platen 5 and hot roll 11 and belt members 23 tends to slow up and hold back the moving pieces and this results in the adjoining edges of the veneer pieces being very firmly pressed together at a location between the last set of rolls 18 and the point where the veneer pieces pass between the hot roll 11 and platen 5. As the contacting edges of the veneer pieces with the wet glue thereon pass between the hot roll 11 and platen 5 the adjoining edges of the veneer pieces are leveled and pressed flush with each other and an initial and partial setting of the glue takes place. When two adjoining edges of the veneer pieces pass under the hot roll 11 they also pass under the endless belt members 23 and when they pass beyond the hot roll 11 they are held very firmly in contact with the continuously moving platen 5 by the belt members 23 and each pair of adjoining edges is held immovable relative to the surface of the platen 5 and immovable relative to each other until the glue is set with ample strength to hold the edges. By using a strong quick setting synthetic resin glue I am able to edge glue the veneer pieces together so strongly that when the finished veneer sheet is put under tension it will split or separate along other lines but not on the glue lines, thus showing that the glued edges are stronger than the remainder of the sheet.

Different glues may require a different degree of heat or a different curing time. I have been able to cure the glue by maintaining the glued edges in contact with the heated moving platen 5 for about fifteen seconds. The size of the platen may be varied to suit the requirements as to rate of output desired. With a platen 5 six feet in diameter I am able to discharge edge glued stock of any width up to the maximum width of the machine at a rate of about forty lineal feet per minute. At this rate it is possible to edge glue the veneer stock for a large veneer plant with one edge gluing machine.

The belt members 23 are of heat resistance material such as twisted wire cable, are close enough together so that no relative movement of the edge portions of the pieces between said belts is permitted and are provided with individual resilient tighteners so that each belt is always maintained taut. Obviously belt structure of this nature will operate efficiently with short lengths of veneer pieces where only part of the belt members are in engagement with the stock and the rest of said belt members are operating idly in contact with the platen 5.

The foregoing description and accompanying drawings clearly disclose my method of edge gluing veneer stock and certain preferred devices for facilitating the carrying out of this method, but it will be understood that this disclosure is merely illustrative and that changes may be made both in the method and in the devices used in carrying out the method within the scope and spirit of the following claims.

I claim:

1. The method of edge gluing thin veneer strips while the strips are moved continuously to provide a continuously discharging sheet of veneer in which the veneer strips extend across the sheet, comprising applying glue to the edges of the veneer strips; pressing the adjoining glued edges of said veneer strips together; moving said strips continuously in a direction transverse to their length; rigidly supporting and flexibly pressing said veneer strips respectively on opposite sides to level the adjoining glued edges and hold said adjoining glued edges flush and immovable relative to each other as the strips are advanced; and applying heat to said strips to cure and set the glue while the edges of said strips are held relatively immovable and said strips are moved continuously in a direction transverse of their length.

2. The method of edge gluing thin veneer strips while the strips are moved continuously to provide a continuously discharging sheet of veneer in which the veneer strips extend across the sheet, comprising applying glue to the edges of the veneer strips; advancing said veneer strips continuously in a direction transverse to their length by exerting thereon a pushing force to firmly press said edges together while forcing the edges into the same plane; rigidly supporting and flexibly pressing said strips substantially over their entire areas, respectively, on opposite sides to maintain the abutting edges flush and immovable with respect to each other; and applying heat to said strips to cure and set the glue while the glued edges of said strips are held relatively immovable and the strips are continuously moved in a direction transverse to their length.

3. The method of edge gluing thin veneer strips while said strips are moved continuously in a circular path to provide a continuously discharging sheet of veneer in which the veneer strips extend across the sheet, comprising applying glue to the edges of the veneer strips; continuously pressing the adjoining glued edges of said veneer strips together and into the same plane; moving said veneer strips continuously in a circular path with the adjoining edges of the strips extending in a direction transverse to the direction of movement of the strips; non-yieldingly supporting the inner sides of said veneer strips throughout their entire area while said strips are moving in said circular path; yieldingly pressing in the outer sides of said veneer strips inwardly to hold said adjoining glued edges flush and immovable relative to each other while the strips are moving in said circular path; and applying heat to said strips to cure and set the glue while the edges of said strips are held relatively immovable and said strips are moved continuously in said circular path.

WILLIAM J. MILLER.